United States Patent [19]

Sato et al.

[11] Patent Number: 5,402,248
[45] Date of Patent: Mar. 28, 1995

[54] IMAGE ENCODING APPARATUS AND METHOD

[75] Inventors: Mamoru Sato, Tokyo; Hidefumi Osawa, Kawaguchi, both of Japan

[73] Assignee: Canon Kabushiki Kaisha, Tokyo, Japan

[21] Appl. No.: 40,443

[22] Filed: Apr. 1, 1993

[30] Foreign Application Priority Data

Apr. 3, 1992 [JP] Japan .................. 4-082309

[51] Int. Cl.$^6$ .............................................. G03F 3/08
[52] U.S. Cl. .................................... 358/426; 358/261.1; 358/261.2; 358/445; 358/451
[58] Field of Search ... 358/426, 427, 433, 261.1–261.4, 358/262.1, 262.2, 434, 431, 451, 495, 411, 413

[56] References Cited

U.S. PATENT DOCUMENTS

| | | | |
|---|---|---|---|
| 4,682,215 | 7/1987 | Adachi | 358/75 |
| 5,086,487 | 2/1992 | Katayama et al. | 382/56 |
| 5,121,448 | 6/1992 | Katayama et al. | 382/57 |

Primary Examiner—Edward L. Coles, Sr.
Assistant Examiner—John Ning
Attorney, Agent, or Firm—Fitzpatrick, Cella, Harper & Scinto

[57] ABSTRACT

An image processing apparatus is provided which can shape codes and omit buffers at a decoding side as well as omit an image memory at an encoding side by providing code buffers for respective encoders. An image encoding apparatus for encoding image information in a hierarchical form includes encoders provided for respective hierarchies and code buffers provided after the respective encoders. Furthermore, it is possible to use a common code buffer memory for respective hierarchies at the encoding side. In such a case, by arranging so that a hierarchical tag can identify to which hierarchy a code belongs, a simplified encoding apparatus is provided.

22 Claims, 7 Drawing Sheets

IMAGE ENCODING APPARATUS AND METHOD

BACKGROUND OF THE INVENTION

1. Field of the Invention

This invention relates to an image encoding apparatus and a method for encoding image information in a hierarchical form, and more particularly, to an image encoding apparatus and method which are suitable for hierarchical image encoding in, for example, a static-image filing apparatus or a transmission apparatus.

2. Description of the Related Art

A conventional hierarchical image encoding method is described in, for example, "International Standard for Multimedia Encoding" edited by Hiroshi Yasuda (ISBN4-621036149C3055). When transmitting an image using the conventional encoding method, rough image information is transmitted first, followed by transmission of additional information that is used by a receiving device to gradually generate a detailed image.

Conventionally, for performing hierarchical image encoding, an image filing apparatus as shown in FIG. 5 has been used. In such an apparatus, no consideration is given to, for example, the order of generating detailed image information (detailed codes) 114, intermediate image information (intermediate detailed codes) 113, and rough image information (rough codes) 112 shown in FIG. 5.

However, for standard codes, only codes having the structures shown in FIGS. 6, 7, 8, 9, 10 and 11 are permitted. In FIGS. 6 through 11, reference numerals 111, 121, 131, 141 and 151 represent headers, and reference numeral 161 represents an interruption code.

Accordingly, for example, when a code includes only an intermediate detailed code 113 as shown in FIG. 11, the same header is used as in the case when a code also includes a detailed code 114, as shown in FIG. 8. Hence, interruption code 161 is provided in code 160 of FIG. 11 to indicate that code 114 is absent.

Accordingly, codes 130 and 160 cannot be discriminated from each other by examining only header 131. Further, the decoding side cannot determine whether transmitted information comprises code 130 or a combination of codes 160 and 150 until the entire code is transmitted.

In order to prevent such problems, the conventional method preserves information in the form of code 110 or 120. However, as can be understood from the configuration of encoders shown in FIG. 5, the generation of each of codes 113 and 114 requires two images having different resolution values. Hence, for generating code 110, the generation of codes 113 and 114 must be delayed and the images having various resolutions must be stored in memory while the generation of code 112 is completed. Such processing requires a large-capacity image memory.

On the other hand, when transmitting code 120, a memory is not needed at the encoding side for separately storing an image having the highest resolution while encoding of an image having the lowest resolution is completed, and the memory therefore can be sequentially cleared for storing an image of low resolution. However, since the decoding side must first perform decoding from data for an image of low resolution, it is necessary to provide a memory to temporarily store data received for an image of high resolution, and therefore to perform complicated processing.

SUMMARY OF THE INVENTION

It is an object of the present invention to solve the above-described problems.

It is a further object of the present invention to provide an image encoding apparatus and method capable of performing high-speed hierarchical encoding.

According to one aspect, the present invention which achieves these objects relates to an image encoding apparatus comprising input means for inputting image data, first reduction means for reducing the input image data and for generating first reduced image data, first encoding means for encoding the input image data input in accordance with the first reduced image data and for outputting first encoded image data, second reduction means for reducing the first reduced image data and for generating second reduced image data, and second encoding means for encoding the first reduced image data in accordance with the second reduced image data and for outputting second encoded image data. The input means, the first reduction means, the second reduction means, the first encoding means and the second encoding means operate in parallel on different pixels of image data.

According to another aspect of the present invention, an image encoding method is provided which includes inputting image data, reducing the input image data to generate first reduced image data, encoding the input image data in accordance with the first reduced image data and outputting first encoded image data. The method further includes reducing the first reduced image data to generate second reduced image data, encoding the first reduced image data in accordance with the second reduced image data and outputting second encoded image data. The inputting step, first reducing step, second reducing step, first encoding step and second encoding step are performed in parallel for different pixels of image data.

According to yet another aspect of the present invention, an image encoding apparatus is provided having input means for sequentially inputting first, second and third image data. First reduction means sequentially receives the first and second image data and reduces it to generate first and second reduced image data. Second reduction means receives the first reduced image data and reduces it to generate third reduced image data. The apparatus also includes first encoding means which encodes the third image data in accordance with the second reduced image data and second encoding means which encodes the second reduced image data in accordance with the third reduced image data while the first encoding means is encoding the third input image data.

According to still another aspect of the present invention, an image encoding apparatus is provided having input means for sequentially inputting a plurality of image data units. First reduction means sequentially reduces the plurality of input image data units to generate a plurality of once-reduced image data units. First encoding means is provided for encoding one of the plurality of input image data units in accordance with one of the plurality of once-reduced image data units while the first reduction means is reducing the one of the plurality of input image data units. The apparatus further includes second reduction means for sequentially reducing the plurality of once-reduced image data units to generate a plurality of twice-reduced image data units. Second encoding means encodes one of the plurality of once-reduced image data units in accordance with one of the plurality of twice-reduced image data units while the second reduction means is reducing the one of the plurality of once-reduced image data units.

It is a still further object of the present invention to generate encoded data which can be easily handled.

It is still a further object of the present invention to reduce the required capacity of a memory for storing data.

It is still another object of the present invention to perform efficient data transmission.

The foregoing and other objects, advantages and features of the present invention will become more apparent from the following description of the preferred embodiments taken in conjuction with the accompanying drawings.

DETAILED DESCRIPTION OF THE PREFERRED EMBODIMENTS

Preferred embodiments of the present invention for solving the above-described problems have the following configurations.

That is, an image encoding apparatus for encoding image information in a hierarchical form includes encoders provided for respective hierarchies, and code buffers provided after the respective encoders.

Another image encoding apparatus for encoding image information in a hierarchical form includes encoders provided for respective hierarchies, and code buffer memories provided after and used for the respective encoders.

Still another encoding apparatus for encoding image information in a hierarchical form includes encoders provided for respective hierarchies, and code buffer memories provided after the respective encoders and commonly used for the respective hierarchies.

Still another encoding apparatus for encoding image information in a hierarchical form includes encoders provided for respective hierarchies, and code buffer memories provided after the respective encoders and commonly used for the respective hierarchies. The apparatus uses hierarchical tags for identifying codes within the code buffer memories.

In any of the above-described configurations, by providing code buffers for respective encoders, it is possible to shape codes and to omit buffers at the decoding side as well as to omit an image memory in the encoding side.

In such cases, code buffer memories at the encoding side can be commonly used for respective hierarchies. By arranging so that a hierarchy tag can identify to which hierarchy a code belongs, it is possible to provide a simplified encoding apparatus.

Preferred embodiments of the present invention will now be specifically described with reference to the drawings.

First Embodiment

Figure 1:
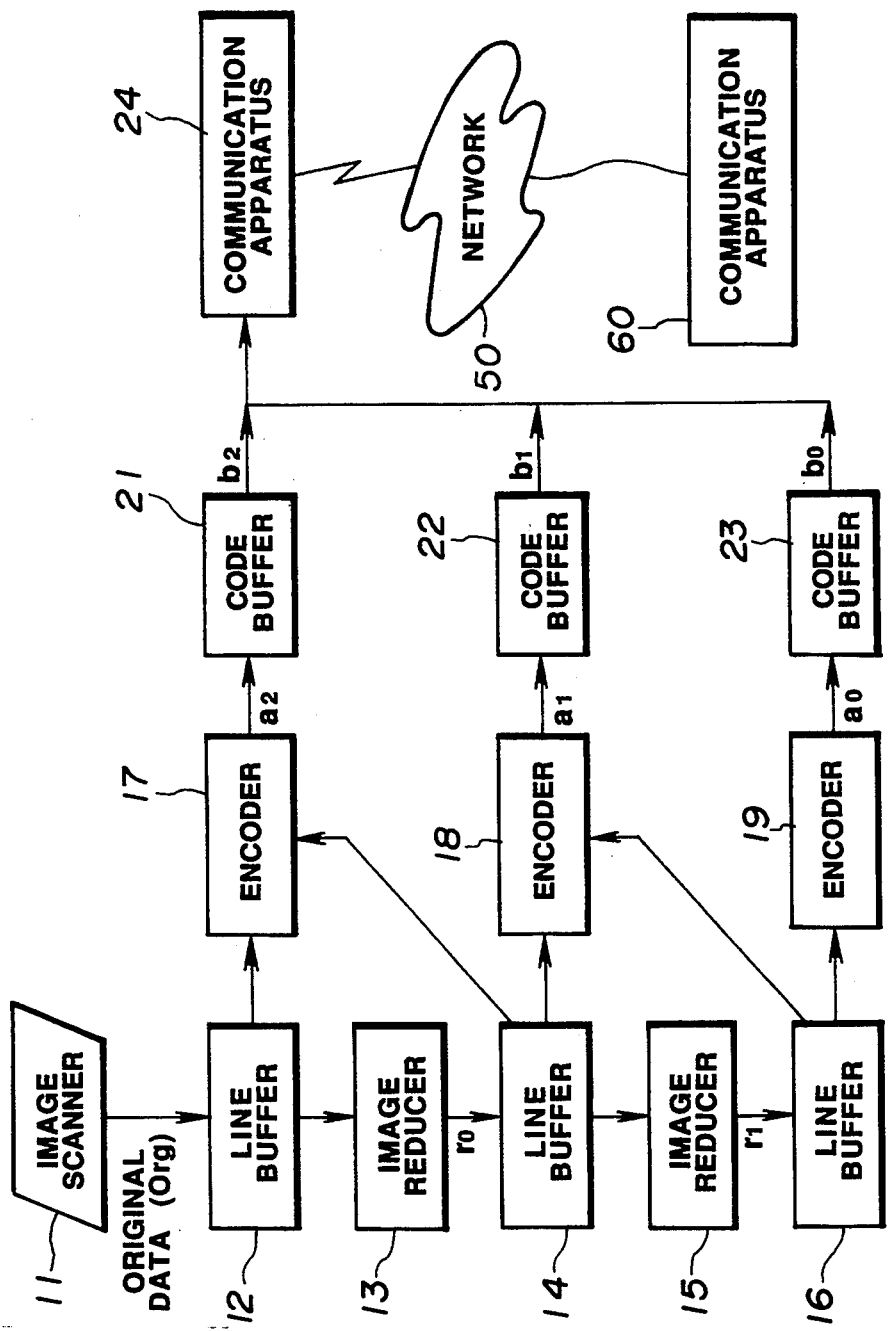
FIG. 1 is a block diagram showing the configuration of a first preferred embodiment of the present invention.

FIG. 1 is a block diagram showing the configuration of a first embodiment of the present invention.

In FIG. 1, when reading of an original by image scanner 11, comprising a CCD (charge-coupled device) line sensor, has been started for respective sequential pixels (picture elements), read image data (original data "Org") are sequentially transferred to and stored in line buffer 12. Line buffer 12 has a capacity of a few lines. When read image data Org have been sequentially transferred to and stored in line buffer 12, the image data are sequentially output from line buffer 12 in the order of reading after a delay corresponding to a reading time for a predetermined number of lines, and are input to image reducer 13. Image reducer 13 sequentially reduces the image data Org from line buffer 12, and outputs reduced data $r_0$ to line buffer 14. The reduced data $r_0$ are sequentially stored in line buffer 14. Line buffer 14 also has a capacity of a few lines.

When the reduced data $r_0$ have been sequentially transferred to line buffer 14, the reduced data $r_0$ are sequentially output from line buffer 14 in the order of storage after a delay corresponding to a reading time for a predetermined number of lines, and are input to image reducer 15. Image reducer 15 further reduces the reduced data $r_0$ from line buffer 14, and outputs reduced data $r_1$ to line buffer 16. The reduced data $r_1$ are sequentially stored in line buffer 16. Line buffer 16 has a capacity of at least the number of lines required when performing encoding by encoder 19.

The read data Org from line buffer 12 are also transferred to encoder 17, along with the reduced data $r_0$ from line buffer 14. Data for encoding the highest resolution image with respect to the intermediate resolution image are generated by encoder 17, and the encoded data are stored in code buffer 21 as encoded data The reduced data $r_0$ from line buffer 14 are also transmitted to encoder 18, along with the reduced data $r_1$ from line buffer 16. Data for encoding the intermediate resolution image with respect to the low resolution image are generated by encoder 18, and the encoded data are stored in code buffer 22 as encoded data $a_1$.

The reduced data $r_1$ from line buffer 16 are also transmitted to encoder 19. Data for encoding the lowest resolution image are generated by encoder 19, and encoded data are stored in code buffer 23 as code $a_0$.

In the above-described embodiment, encoders 17, 18 and 19 use an arithmetic encoding method.

Thus, the original data from scanner 11 are sequentially encoded, and are sequentially stored in code buffers 21-23 as encoded data $a_0$, $a_1$ and $a_2$. After the completion of encoding of a predetermined amount of data Org, the encoded data $a_0$, $a_1$ and $a_2$ stored in code buffers 23, 22 and 21, are sequentially read as encoded data $b_0$, $b_1$ and $b_2$, respectively, and are transferred to communication apparatus 24 connected to network 50.

Figure 6:
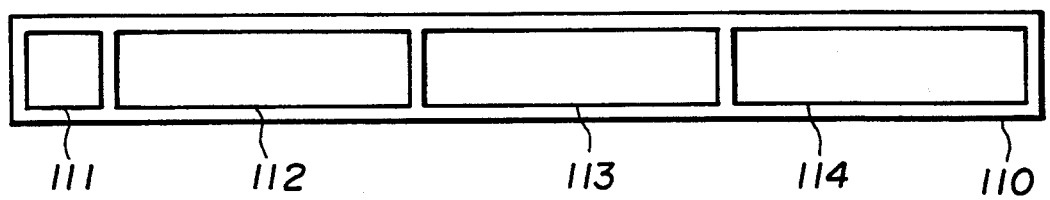
FIGS. 6 through 11 are diagrams illustating standard specifications of the structure of encoded data used in encoding processing of image data.
Figure 7:
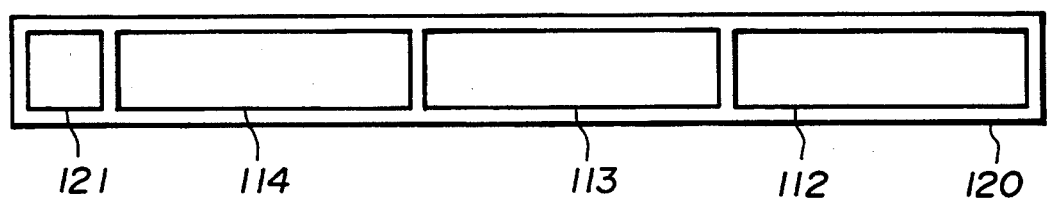
Figure 8:
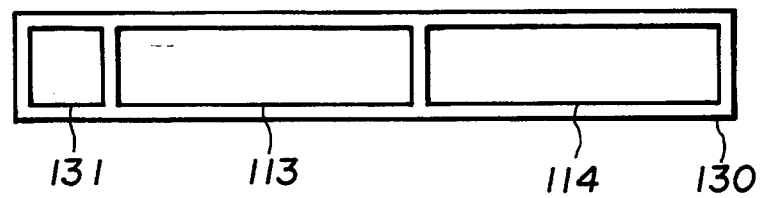
Figure 9:
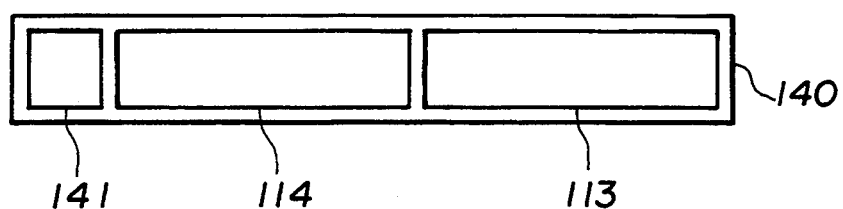
Figure 10:
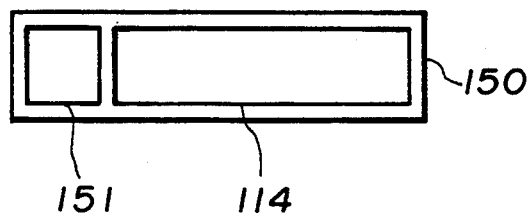

Before the transmission of encoded data $b_0$, $b_1$ and $b_2$, communication apparatus 24 generates, for example, header 111 for code 110 as shown in FIG. 6, and transmits the generated header 111 to a communication partner's apparatus, for example, communication apparatus 60, which is also connected to network 50. After header 111, encoded data $b_0$, $b_1$ and $b_2$ stored in buffers 23, 22 and 21, respectively, are sequentially read, and are transmitted to communication apparatus 60. Since other communication control procedures including the above-described header communication are known, a detailed description thereof is omitted.

Figure 2:
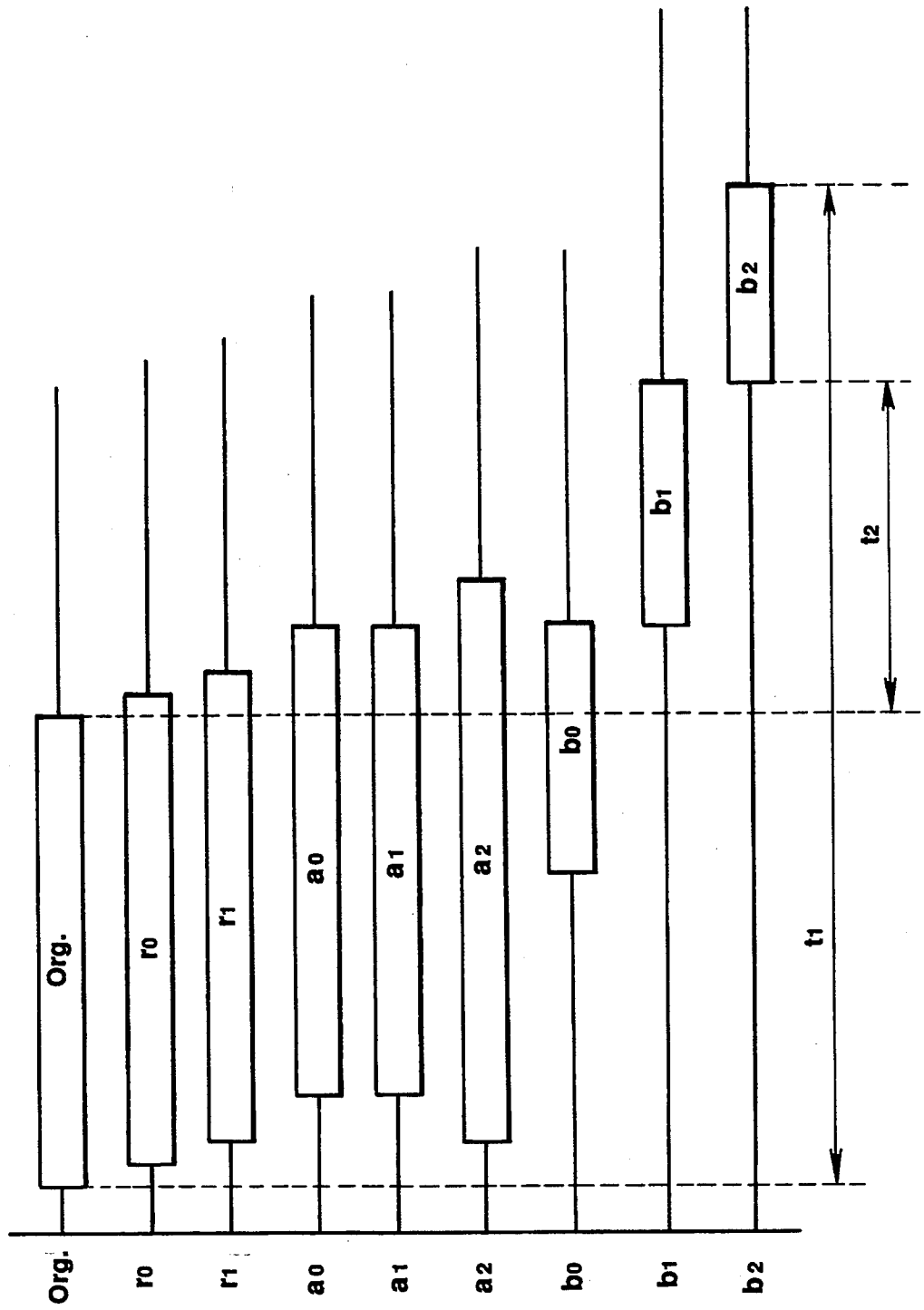
FIG. 2 is a timing chart showing the operational timing of the first embodiment.

FIG. 2 shows the output timing of respective data in the foregoing description. In FIG. 2, data $b_0$ for the lowest resolution image, additional data $b_1$ for the intermediate resolution image, and additional data $b_2$ for the highest resolution image are communicated.

As shown in FIG. 2, in the present embodiment, all encoding processing is completed by time $t_1$ after starting the input of read data Org of the original image, and encoded data are then output to the communication partner's apparatus.

In FIG. 2, reduced data $r_0$ are sequentially generated with a delay corresponding to y lines based on image data Org sequentially input for every pixels. The y lines are the number of lines required for reduction by image reducer 13. Similarly, reduced data $r_1$ are sequentially generated with a delay corresponding to y lines based on the sequentially-generated reduced data $r_0$.

When image data Org for m lines and reduced data $r_0$ for n lines have been generated, encoding by encoder 17 is begun, and encoded data $a_2$ are sequentially generated, where m and n represent the numbers of lines required for encoding by encoder 17. Similarly, encoded data $a_1$ and $a_0$ are sequentially generated.

In parallel with the generation of encoded data $a_0$, encoded data $b_0$ are sequentially transmitted from code buffer 23 followed by the transmission of encoded data $b_1$ and $b_2$.

Thus, in the present embodiment, the generation of image data by image scanner 11, the image reduction by image reducers 13 and 15, and encoding by encoders 17, 18 and 19 are simultaneously performed for different pixels, and line buffers 12, 14 and 18 are provided to enable such processing.

As described above, according to the present embodiment, by providing the configuration shown in FIG. 1 and performing the above-described control, a binary-image encoding apparatus can be provided in which it is unnecessary to provide a large-capacity image memory capable of storing all read data of an original in a non-compressed state, and in which it is unnecessary to rearrange encoded data by another apparatus.

Although in the foregoing description a buffer device (code buffer 23) is provided for encoding data having the lowest resolution, the same effect may be obtained by omitting such a buffer device, that is, code buffer 23 is not a necessary component.

Second Embodiment

In the above-described embodiment shown in FIG. 1, as shown in the timing chart shown in FIG. 2, encoded data $b_1$ buffered at the final stage correspond to encoded data $a_1$ written in the buffer immediately after the start of the input of original image data Org. Accordingly, the above-described first embodiment has, for example, the following problems.

(1) Original image data Org cannot be input for time period $t_2$, which runs from the end of the generation of original image data Org until the start of transmission of encoded data $b_2$. The efficiency of encoding is reduced due to this time period.

(2) Each code buffer must have the capacity to store data of the estimated longest code length.

Figure 3:
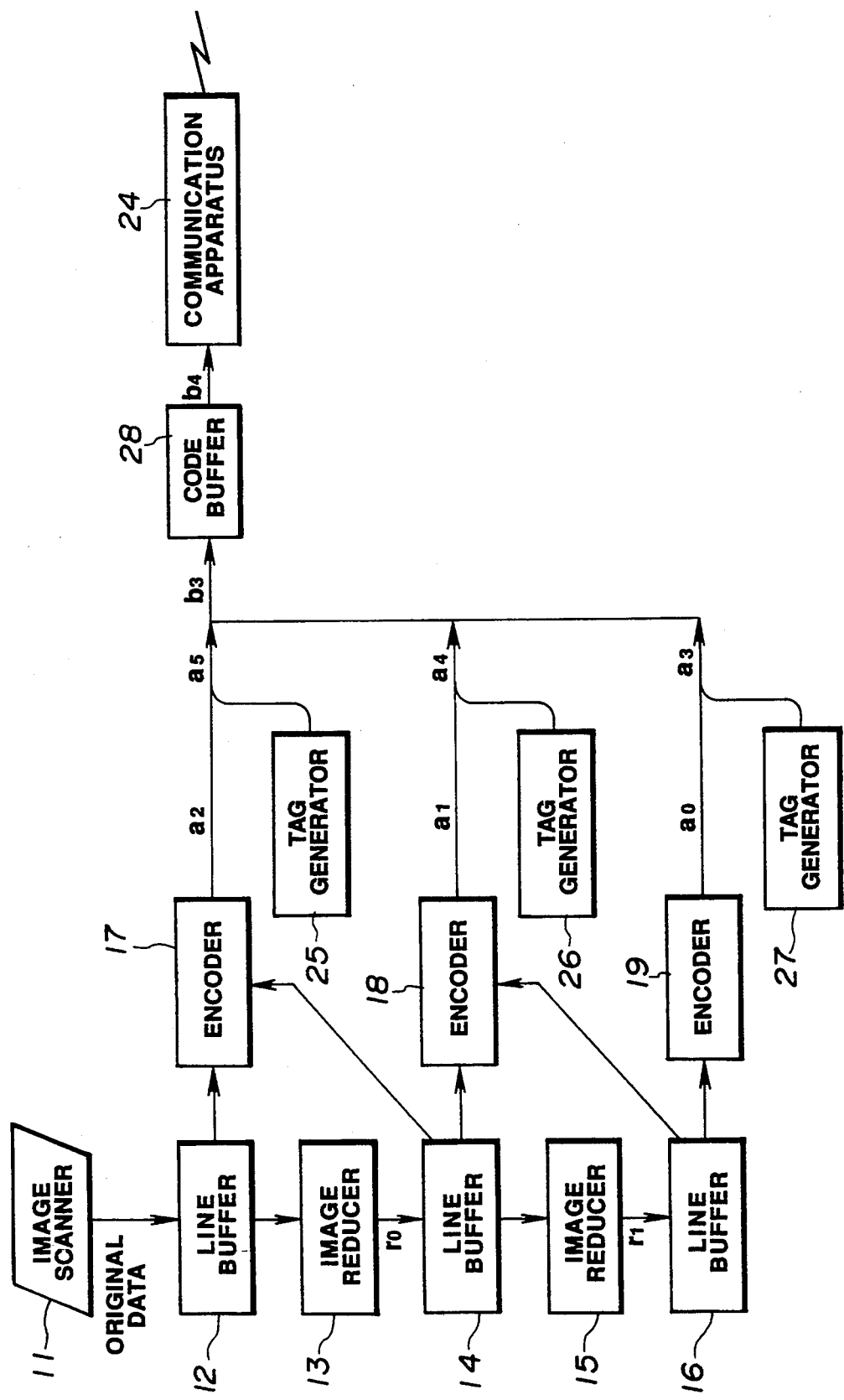
FIG. 3 is a block diagram showing the configuration of a second preferred embodiment of the present invention.
Figure 4:
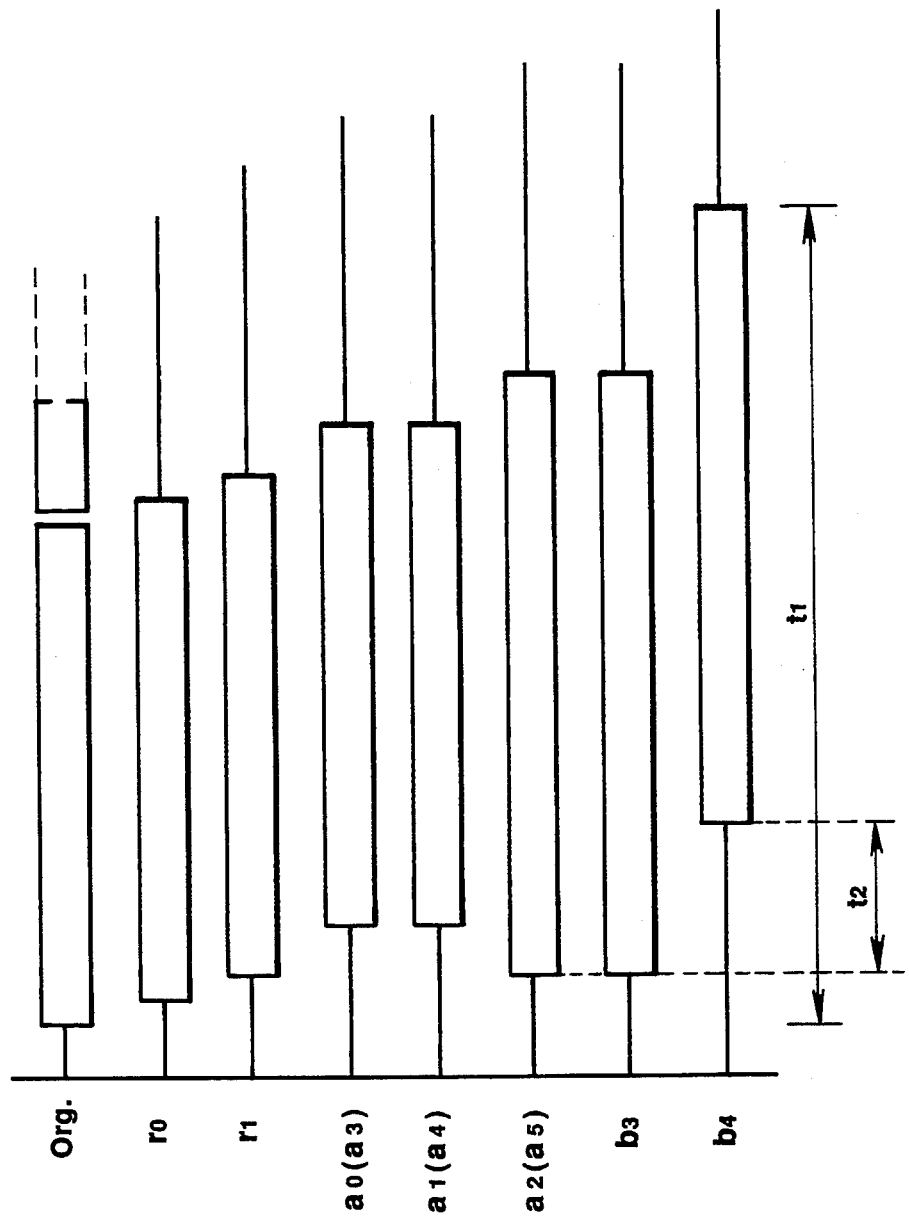
FIG. 4 is a timing chart showing the operational timing of the second embodiment.
Figure 5:
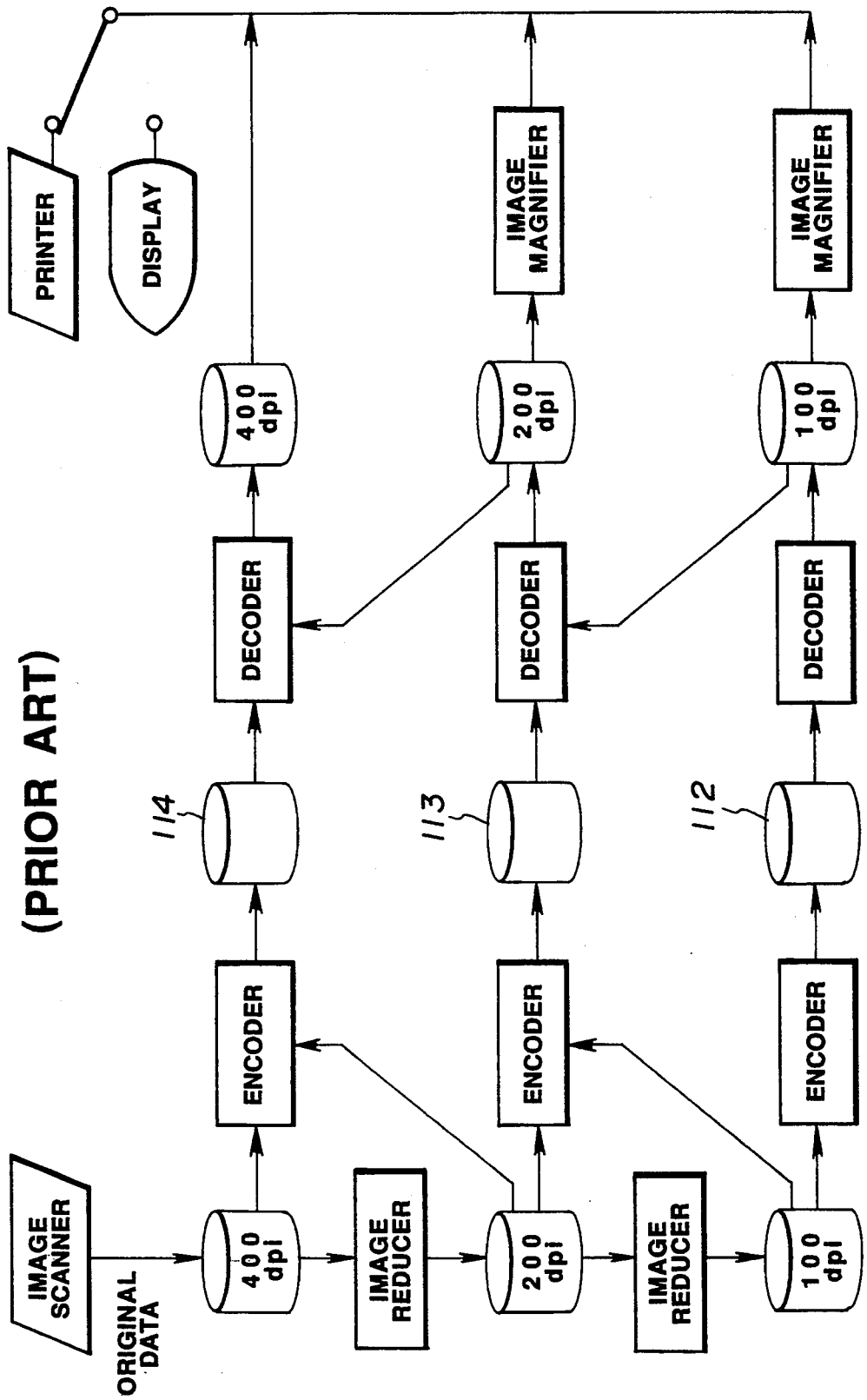
FIG. 5 is a diagram illustrating an encoding method and apparatus for conventional hierarchical image encoding.

A description will now be provided with reference to FIGS. 3 and 4 of a second embodiment of the present invention which overcomes such problems of the first embodiment. In the second embodiment, a code buffer memory is used in common, and a code is identified using a tag.

FIG. 3 is a diagram showing the configuration of the second embodiment. In FIG. 3, the same components as in the first embodiment shown in FIG. 1 are indicated by the same reference numerals, and a detailed description thereof will be omitted.

In FIG. 3, a tag indicating data for the highest resolution image is output from tag generator 28 and is added to encoded data $a_2$ output from encoder 17 to provide encoded data $a_5$, which are stored in code buffer 28. Similarly, a tag indicating data for the intermediate resolution image is output from tag generator 26 and is added to encoded data $a_1$ output from encoder 18 to provide encoded data $a_4$, which are stored in code buffer 28. Similarly, a tag indicating data for the lowest resolution image is output from tag generator 27 and is added to encoded data $a_0$ output from encoder 19 to provide encoded data $a_3$, which are stored in code buffer 28.

After the completion of encoding processing for a predetermined amount of data, communication apparatus 24 first reads and transmits encoded data having a tag indicating that the data corresponds to the lowest resolution image. The communication apparatus 24 then reads and transmits encoded data having a tag indicating that the data corresponds to the intermediate resolution image, and finally reads and transmits encoded data having a tag indicating that the data corresponds to the highest resolution image.

FIG. 4 is the output timing of the respective data in the foregoing description.

As shown in FIG. 4, by performing the above-described control, encoders 17, 18 and 19 can read the next original to be transmitted and perform encoding processing of read image data when encoded data $b_4$ stored in code buffer 28 have begun to be output. For example, in the above-described first embodiment, encoder 17 cannot begin encoding processing of data for the next read original until all encoded data $a_2$ output from encoder 17 are stored in code buffer 21, and the encoded data $a_2$ subjected to buffering start to be output as output signal $b_2$, that is, until time $t_2$ after read data Org have been transmitted. To the contrary, in the second embodiments the encoding processing can be started when encoded data $a_0$ from encoder 19 have begun to be output from code buffer 28.

Figure 11:
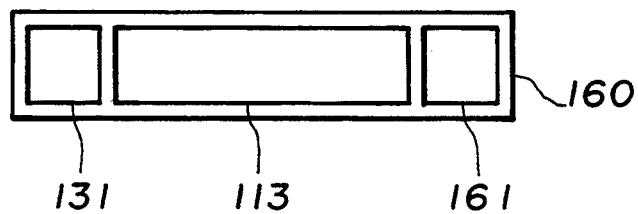

The time difference between the second and first embodiments corresponds to the transmission time of encoded data $a_0$ and $a_1$ (corresponding to data of codes 112 and 113 shown in FIG. 11 if indicated in the transmission control procedure format). This difference is a significant value.

As described above, according to the present embodiment, by using a common buffer and providing encoded data with a tag, it is possible to reduce an idle time in the encoding processing.

According to the above-described embodiments, by providing code buffers after respective encoders, the rearrangement of codes for the respective hierarchies necessary for communication can be performed without providing a memory for storing non-compressed image data of the entire original.

Furthermore, by temporarily adding a tag representing a hierarchy to a code of each hierarchy necessary for communication, a code buffer can be shared, whereby an idle time for encoders can be reduced.

As described above, according to the present invention, by providing code buffers for respective encoders, it is possible to shape codes and to omit buffers at the decoding side as well as to omit an image memory at the encoding side.

Furthermore, it is possible to commonly use a code buffer memory for respective hierarchies at the encoding side. In such a case, by arranging so that a tag representing a hierarchy can identify to which hierarchy a code belongs, it is possible to provide a simplified encoding apparatus.

Although in the above-described image reducers 13 and 15, image reduction is performed using image data of a block comprising N pixels×M pixels, the image reduction method is not limited to such a method.

Although in the above-described encoders 17, 18 and 19, encoding is performed according to a so-called arithmetic encoding method, any other method, such as an entropy encoding method, a vector quantization method or an orthogonal transmform method, may also be used.

Furthermore, image data Org may be input not from an image scanner, but from a host computer.

The individual components shown in outline or designated by blocks in the drawings are all well-known in the image encoding arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image encoding apparatus, comprising:
   input means for inputting image data;
   first reduction means for reducing the input image data and for generating first reduced image data;
   first encoding means for encoding the input image data in accordance with the first reduced image data and for outputting first encoded image data;
   second reduction means for reducing the first reduced image data and for generating second reduced image data; and
   second encoding means for encoding the first reduced image data in accordance with the second reduced image data and for outputting second encoded image data,
   wherein said input means, said first reduction means, said second reduction means, said first encoding means and said second encoding means operate in parallel on different pixels of image data.

2. An apparatus according to claim 1, further comprising:
   first delay means for delaying the input image data; and
   second delay means for delaying the first reduced image data.

3. An apparatus according to claim 1, further comprising memory means for storing the first and second encoded image data.

4. An apparatus according to claim 3, wherein said memory means comprises a single device.

5. An apparatus according to claim 1, further comprising transmission means for sequentially transmitting the second and first encoded image data.

6. An apparatus according to claim 1, wherein said first and second reduction means reduce image data using a plurality of pixels from different lines of an image.

7. An apparatus according to claim 1, wherein said first and second encoding means encode image data using an arithmetic encoding method.

8. An apparatus according to claim 1, further comprising tag means for adding tags to the first and second encoded image data.

9. An apparatus according to claim 1, wherein said input means comprises an image scanning apparatus including a photoelectric conversion device.

10. An apparatus according to claim 1, wherein said input means comprises a host computer.

11. An apparatus according to claim 1, further comprising third encoding means for encoding the second reduced image data and for generating third encoded image data, wherein said third encoding means operates in parallel with said input means, said first reduction means, said second reduction means, said first encoding means and said second encoding means on different pixels of image data.

12. An image encoding method, comprising the steps of:
   inputting image data;
   reducing the input image data to generate first reduced image data;
   encoding the input image data in accordance with the first reduced image data and outputting first encoded image data;
   reducing the first reduced image data to generate second reduced image data; and
   encoding the first reduced image data in accordance with the second reduced image data and outputting second encoded image data,
   wherein said inputting step, said first reducing step, said second reducing step, said first encoding step and said second encoding step are performed in parallel for different pixels of image data.

13. A method according to claim 12, further comprising the steps of:
   delaying the input image data; and
   delaying the first reduced image data.

14. A method according to claim 12, further comprising the step of storing the first and second encoded image data in a memory.

15. A method according to claim 14, wherein said storing step further comprises storing the first and second encoded image data in a single device.

16. A method according to claim 12, further comprising the step of sequentially transmitting the second and first encoded image data.

17. A method according to claim 12, wherein in said first and second reducing steps, image data are reduced using a plurality of pixels from different lines of an image.

18. A method according to claim 12, wherein in said first and second encoding steps, image data are encoded using an arithmetic encoding method.

19. A method according to claim 12, further comprising the step of adding tags to the first and second encoded image data.

20. A method according to claim 12, wherein said inputting step is performed by an image scanning apparatus including a photoelectric conversion device.

21. An apparatus according to claim 12, wherein said inputting step is performed by a host computer.

22. An image encoding method according to claim 12, further comprising the step of encoding the second reduced image data and outputting third encoded image data, wherein said third encoding step is performed in parallel with said inputting step, said first encoding step, said second encoding step, said first reducing step and said second reducing step for different pixels of image data.

* * * * *